United States Patent
Xiao et al.

(10) Patent No.: US 12,047,842 B2
(45) Date of Patent: Jul. 23, 2024

(54) METHOD FOR IDENTIFYING TRAVEL CLASSIFICATION BASED ON SMARTPHONE TRAVEL SURVEYS

(71) Applicant: Shanghai Maritime University, Shanghai (CN)

(72) Inventors: Guangnian Xiao, Shanghai (CN); Yu Xiao, Shanghai (CN); Xianhua Wu, Shanghai (CN); Bangping Gu, Shanghai (CN); Ruinan Wang, Shanghai (CN); Qiongwen Lu, Shanghai (CN); Zihao Wang, Shanghai (CN); Qing'an Cui, Shanghai (CN); Jungang Shao, Shanghai (CN)

( * ) Notice: Subject to any disclaimer, the term of this patent is extended or adjusted under 35 U.S.C. 154(b) by 362 days.

(21) Appl. No.: 17/582,127

(22) Filed: Jan. 24, 2022

(65) Prior Publication Data

US 2022/0248179 A1   Aug. 4, 2022

(51) Int. Cl.
*H04W 4/029* (2018.01)
*G06F 18/2431* (2023.01)
*G06N 3/04* (2023.01)

(52) U.S. Cl.
CPC ........ *H04W 4/029* (2018.02); *G06F 18/2431* (2023.01); *G06N 3/04* (2013.01)

(58) Field of Classification Search
CPC ..... H04W 4/029; H04W 4/02; G06F 16/9537; G06F 16/35; G06F 16/182; G06F 16/29; G06F 16/951; G06F 16/9535; G06F 16/958; G06F 40/289; G01C 21/3492; G01S 19/46; G01S 5/0294; G06N 3/006; G06N 3/04; G06N 3/08; H04L 67/535
See application file for complete search history.

(56) References Cited

U.S. PATENT DOCUMENTS

| | | | |
|---|---|---|---|
| 9,047,384 B1* | 6/2015 | Barbeau | H04W 4/029 |
| 2015/0198722 A1* | 7/2015 | Ben-Akiva | G08G 1/0112 |
| | | | 701/472 |

FOREIGN PATENT DOCUMENTS

| | | | | |
|---|---|---|---|---|
| CN | 102799897 A | 11/2012 | | |
| CN | 106197460 A | 12/2016 | | |
| CN | 107330088 A | 11/2017 | | |
| CN | 107948312 A | * 4/2018 | ........... | G06F 16/182 |
| CN | 110378517 A | 10/2019 | | |
| CN | 111046937 A | 4/2020 | | |

* cited by examiner

*Primary Examiner* — Matthew C Sams
(74) *Attorney, Agent, or Firm* — Lei Jiang

(57) ABSTRACT

The present invention discloses a method for identifying travel classification based on smartphone travel surveys. The method takes individual volunteers as the object, GPS information collected by smartphones and instant recall verification features of respondents as the data source. First, travel features, individual features, and family features are determined by GPS data and questionnaire information of volunteers. Then, a training data set is determined by the equal proportion method. Finally, an artificial neural network combined with a particle swarm optimization algorithm is used to detect travel classification from the survey data. The method described in the invention can realize automatic identification of six travel classifications. It is conducive to replace the traditional resident travel survey with the advanced survey method under the environment of big data. At the same time, it provides data foundation for urban management and planning.

1 Claim, 3 Drawing Sheets

METHOD FOR IDENTIFYING TRAVEL CLASSIFICATION BASED ON SMARTPHONE TRAVEL SURVEYS

CROSS-REFERENCE TO RELATED APPLICATIONS

The subject application claims priority of the Chinese invention application 202110109410.X filed on 2021 Jan. 25 in China. The contents and subject matter thereof are incorporated herein by reference.

FIELD OF INVENTION

The present invention relates to the field of travel classification identification, and relates in particular to a method for identifying travel classification based on smartphone travel surveys.

BACKGROUND ART

The daily travel classification survey of residents is an important content in traffic survey, and it is also the main data source for travel behavior analysis and modeling. It is of great significance to urban functional structure planning, urban road network planning, traffic organization design and optimization. The traditional travel survey requires volunteers to report the origin and destination, starting and ending time, travel mode and travel classification of each travel during the survey period, which will impose a great burden on volunteers, and the data accuracy is difficult to be guaranteed.

With the development and popularization of communication and Internet technology, the research on big data mining which contains a large amount of potential information arises at the historic moment. At present, there are a large number of GPS and video surveillance equipment that can sense and record the real-time location information of individuals. Global Positions-based travel survey has potential advantages over traditional survey in the following aspects: (1) positioning data is collected passively and will not burden the interviewees; (2) the complete route of most travels is recorded, thereby it is possible to recover the unreported itinerary; (3) it can automatically detect the accurate start and end time of the travel as well as the length of the travel, which improves the accuracy and convenience of collecting travel features. However, the subjective travel behavior information such as travel classification cannot be perceived directly through information devices.

In the current research, when describing data features, most of the travel features are only described based on features of the points of interest at the travel endpoints. However, as the urban land-usage becomes more and more complex, the residents travel modes become more and more diversified, it is difficult to accurately identify the travel classification only according to the points of interest. Previous studies often lack comprehensiveness in the description of individual features and family features, so more comprehensive features variables are needed to effectively describe data features. On the other hand, the existing machine learning methods of travel classification detection include support vector machine, random forest, polynomial logic model, back propagation algorithm and decision tree. The models of these machine learning methods often directly output non-probabilistic category determination, which means that they cannot deal with the fuzziness inherent in travel classification detection, and the back propagation algorithm is easy to fall into local optimum. Meanwhile, these models also require complex priori restrictions and the final classification ability is relatively low.

SUMMARY OF THE INVENTION

In view of this, we can find that more comprehensive features variables can be used to describe data features. By adding targeted features description into the land-usage type of travel features, combined with effective individual features and family features, individual travel data can be described more comprehensively, thus improving the detection accuracy in the identification stage. At the same time, the artificial neural network which does not depend on any specific distribution data and the particle swarm optimization algorithm can avoid falling into local optimum when selecting the model. Using artificial neural network to describe the complex and highly non-linear relationship between dependent variables and independent variables and effectively deal with noisy input data can greatly improve the identification accuracy. Therefore, aiming at the problems of incomplete features description and relatively low recognition accuracy in the current travel classification and recognition, the present invention proposes a travel classification and recognition method based on smartphone travel survey and artificial neural network particle swarm optimization algorithm.

Automatic identification of travel classification and understanding of residents' travel characteristics can provide data support for traffic construction, management and planning. When the travel purpose identification with large amount of data is carried out, this method can be used as an auxiliary means of travel investigation to verify the traveler's travel records. When the same travel classification is more concentrated, corresponding infrastructure can be added to provide better services. For example, when there are a large number of identified travel sections for work or school, corresponding shuttle bus or carpool services can be provided to alleviate traffic pressure when the coincidence degree in GPS trajectory data is large. The establishment of urban traffic corridors along the routes with concentrated commuter passenger flow can meet the needs of volunteers for efficient and convenient travel, effectively reduce environmental pollution such as haze, noise and tail gas, and achieve the purpose of urban energy conservation, environmental protection, and sustainable development.

In order to achieve the above classification, the present disclosure adopts the following technical solutions:

The method for identifying travel classification based on smartphone travel surveys, which specifically comprises the following steps:

(1) collecting a multitude of addresses and encoding land-usage types;

step i. obtaining all addresses from a city's municipal database and classifying all addresses into 20 land-usage types, comprising type of residential area, type of administrative agency, type of school, type of gymnasium, type of medical establishment, type of retail shop, type of restaurant, type of hotel, type of financial institution, type of factory, type of logistics & warehouse, type of railway/bus station, type of sidewalk, type of provincial road, type of highway, type of parking lot, type of public utilities, type of park, type of river, and type of farming land;

step ii. obtaining corresponding longitude and latitude for each of the multitude of the addresses, and constructing Thiessen polygons as below: taking the addresses comprising various longitudes and latitudes as discrete points, and constructing, from the discrete points, a Delaunay triangulation network comprising a multitude of triangles; a Delaunay triangulation satisfies the rule that a Delaunay triangulation is a set of triangles that are adjacent to each other and do not overlap with each other, and that the circumcircle of each triangle contains no other points; a Delaunay triangulation is formed by connecting points corresponding to Voronoi polygons; the Delaunay triangle is formed by connecting three adjacent vertices, and the Voronoi polygons corresponding to the three adjacent vertices have a common vertex which is the center of the circumcircle of the Delaunay triangle; for each discrete point, selecting all triangles adjacent to one another and with said each discrete point as a common vertex; drawing a circumscribed circle for each triangle; connecting circumcircle centers of the circumscribed circles successively to obtain a Thiessen polygon; all polygons forming a set of Thiessen polygons; Each Thiessen polygon contains only one discrete point data; the point in the Thiessen polygon is closest to the corresponding discrete point; a point on the edge of a Tyson polygon is equidistant from the discrete points on both sides of the polygon;

step iii. grouping the 20 land-usage types of the Thiessen polygons into 10 types containing type of residential, type of administration & public services, type of commercial & business, type of industrial, type of logistics & warehouse, type of street & transportation, type of municipal utilities; type of green space, type of water bodies, and type of miscellaneous; renaming the type of residential area as the type of residential; grouping the type of administrative agency, the type of school, the type of gymnasium, the type of medical establishment into the type of administration & public services; grouping the type of retail shop, the type of restaurant, the type of hotel, the type of financial institution into the type of commercial & business facilities; renaming the type of factory industrial as the type of industrial; the type of logistics & warehouse remaining unchanged; grouping the type of railway/bus station, the type of sidewalk, the type of provincial road, the type of highway, the type of parking lot into the type of street & transportation; renaming the type of public utilities including water, power, heat, gas supply, park as the type of municipal utilities; renaming the type of park as the type of green space; renaming the type of river as the type of water bodies; renaming the type of farming land as the type of miscellaneous;

(2) collecting, processing, and cleaning trajectory data acquired by positioning software;

step i. installing positioning software in a smart phone of a volunteer with consent of the volunteer, and starting the software to record positioning data during travel, and then uploading the positioning data to database of server; the positioning data containing a series of positioning points in chronological order, and the data of positioning data including Universal time, user number, longitude, latitude, altitude, speed, horizontal position accuracy, number of satellites, and travel classification;

step ii. for two adjacent positioning points $d_1$ and $d_2$, calculating a distance d between $d_1$ and $d_2$, as $d=2R \cdot \arcsin(\sqrt{h})$, wherein $h=\sin^2(\Delta\varphi/2)+\cos(\varphi_1)\cos(\varphi_2)\sin^2(\Delta\lambda)$, wherein R being radius of the Earth, taken to be 6371 km, $\varphi_1$ being the latitude of the first positioning point, and $\varphi_2$ being the latitude of the second positioning point; $\Delta\lambda$ being the difference in longitude between the two points, and $\Delta\varphi$ being the difference in latitude between the two points;

calculating a speed of the positioning point at an interval of 2 seconds, with the speed corresponding to the $i^{th}$ positioning point being calculated as $v_i=(d_{i-1,i}+d_{i,i+1})/(t_{i+1}-t_{i-1})$, wherein $d_{i-1,i}$ representing the distance between the i-$1^{th}$ positioning point and the $i^{th}$ positioning point; $t_{i-1}$ representing positioning time of the i-$1^{th}$ positioning point; taking the calculated speed as an instantaneous speed of the $i^{th}$ point;

step iii. deleting the positioning points with either one of Universal Time, longitude, latitude, altitude, speed, horizontal position accuracy or satellite number missing; deleting the positioning points with less than 4 visible satellites; deleting the positioning points with horizontal position accuracy factor value greater than 6; deleting the positioning points with speed exceeding 200 km/H;

(3) collecting personal characteristic data and travel characteristic data;

step i. for each volunteer, forming a travel segment from a starting positioning point to an end positioning point in chronological order; dividing the travel segment into a multitude of sub-segments according to travel classifications; for each sub-segment O comprising two vectors X and P, wherein X representing the characteristics of the sub-segment, and P representing the travel classification of the sub-segment, wherein $X=(x_1, x_2, \ldots, x_{28})$, and $P=(p_1, p_2, p_3, p_4, p_5, p_6)$;

step ii. obtaining individual variables of volunteers in each sub-segment O by means of questionnaires, including age, gender, educational level, whether the working hours are fixed, monthly income, whether there are children in primary school in the family, and whether there are children in middle school in the family, which were expressed by $x_1, x_2, x_3, x_4, x_5, x_6, x_7$ respectively;

obtaining travel variables of each sub-segment O through the positioning software, including the sub-segment occurrence date, the sub-segment duration, the time from 12 o'clock in the morning to the start of the sub-segment, and five travel modes, which are respectively represented by $x_8, x_9, x_{10}, x_{11}, x_{12}, x_{13}, x_{14}, x_{15}$;

determining the land-usage type of the travel endpoint by means of the position of the sub-segment endpoint situated in the Thiessen polygons, being represented by $x_{16}, x_{17}, x_{18}, x_{19}, x_{20}, x_{21}, x_{22}, x_{23}, x_{24}, x_{25}$; the variables $x_{26}, x_{27}, x_{28}$ indicating whether the endpoint of the sub-segment is at type of home address, at type of work address, or at type of frequently-visited grocery store address;

the value rules of each variable are as follows: $x_1$ being a specific number indicating an age; $x_2=1$ or 0 indicating respectively the type of gender being male or female; $x_3=1$ indicating the type of educational level being bachelor degree or above, 0 otherwise; $x_4=1$ indicating the type of working time being fixed, 0 otherwise; $x_5=1$ indicating the type of monthly income being more than $500, 0 otherwise; $x_6=1$ indicating family of the volunteer having children in primary school, 0 otherwise; $x_7=1$ indicating family of the volunteer having children in secondary school, 0 otherwise; $x_8=1$ indicating the sub-segment O occurring date being on the weekend, 0 otherwise; $x_9$ being a specific number indicating duration minutes of the sub-segment O; $x_{10}$ being a specific number indicating minutes from 12 a.m. to the start time of the sub-segment O; $x_{11}=1$ indicating type of the travel mode being walking, 0 otherwise; $x_{12}=1$ indicating type of the travel mode being bicycle, 0 otherwise; $x_{13}=1$ indicating type of the travel mode being electric vehicle, 0 otherwise; $x_{14}=1$ indicating type of the travel mode being bus, 0 otherwise; $x_{15}=1$ indicating type of the travel mode being car, 0 otherwise; $x_{16}=1$ indicating the land-usage type of the sub-segment endpoint being the type of residential, 0 otherwise; $x_{17}=1$ indicating the land-usage type of the sub-segment endpoint being the type of administration & public services, 0 otherwise; $x_{18}=1$ indicating the land-usage type of the sub-segment endpoint being the type of commercial & business facilities, 0 otherwise; $x_{19}=1$ indicating the land-usage type of the sub-segment endpoint being the type of industrial, 0 otherwise; $x_{20}=1$ indicating the land-usage type of the sub-segment endpoint being the type of logistics & warehouse, 0 otherwise; $x_{21}=1$ indicating the land-usage type of the sub-segment endpoint being the type of street & transportation, 0 otherwise; $x_{22}=1$ indicating the land-usage type of the sub-segment endpoint being the type of municipal utilities, 0 otherwise; $x_{23}=1$ indicating the land-usage type of the sub-segment endpoint being the type of green space, 0 otherwise; $x_{24}=1$ indicating the land-usage type of the sub-segment endpoint being the type of water bodies, 0 otherwise; $x_{25}=1$ indicating the land-usage type of the sub-segment endpoint being the type of miscellaneous, 0 otherwise; $x_{26}=1$ indicating the land-usage type of the sub-segment endpoint being the type of home, 0 otherwise; $x_{27}=1$ indicating the land-usage type of the sub-segment endpoint being the type of work & education, 0 otherwise; $x_{28}=1$ indicating the land-usage type of the sub-segment endpoint being the type of grocery store, 0 otherwise;

$p_1=1$ indicating the travel classification of the O being the type of going-home, 0 otherwise; $p_2=1$ indicating the travel classification of the O being the type of work-attending, 0 otherwise, and the type of work-attending also representing education-attending in the present invention; $p_3=1$ indicating the travel classification of the O being the type of dining-out, 0 otherwise; $p_4=1$ indicating the travel classification of the O being the type of shopping, 0 otherwise; $p_5=1$ indicating the travel classification of the O being the type of social-visiting, 0 otherwise; $p_6=1$ indicating the travel classification of the O being the type of non-commercial-driving representing picking up or dropping off someone in the present invention, 0 otherwise;

(4) constructing an artificial neural network based on particle swarm optimization for identifying travel classifications;

step i. building an artificial neural network with variables $x_0, x_1, \ldots, x_{28}$ in step c as an input layer, with predicted travel classification as an output layer, with a hidden layer with q neurons as $a_0, a_1, a_2, \ldots, a_q$; $x_0$ and $a_0$ are bias units;

dividing samples to be six groups according to P; choosing three-quarters randomly from each group to form a training data set and remaining one-quarter from each group to form a test data set;

for a weight matrix $\theta^{(1)}$ between the input layer and the hidden layer; employing linear weighted sum to obtain $\text{Netin}_{t_1}=\Sigma_{j=0}^{28}\theta_{t_1,j}^{(1)}x_j$ of an $t_1^{th}$ neuron of the hidden layer, wherein $t_1$ ranging from 1 to q; obtaining an output of the $t_1^{th}$ neuron $a_{t_1}=f(\text{Netin}_{t_1})$ by a activation sigmoid function $$f(x) = \frac{1}{1+\exp(-x)};$$

for a weight matrix $\theta^{(2)}$ between the hidden layer and the output layer, employing linear weighted sum to obtain $\text{Outnetin}_{t_2}=\Sigma_{j=1}^{6}\theta_{t_2,j}^{(2)}a_j$ of the $t_2^{th}$ neuron of the output layer, wherein $t_2$ ranging from 1 to 6; obtaining an output of the $t_2^{th}$ neuron by inverse function: $P_{t_2}=f^{-1}(\text{Outnetin}_{t_2})$; for real output vectors $P_t$, obtaining a root mean square error of prediction result as: $\text{RMSE}=\sqrt{\Sigma_{j=1}^{N}\Sigma_{i=1}^{6}(P_{j,t_2}-P_{j,t})^2}$, where N is number of samples in the training data set, $P_{j,t_2}$ and $P_{j,t}$ are used to indicate predicted travel classification and reported travel classification respectively; obtaining fitness function as:

$$\text{fitness} = \frac{1}{1+\sqrt{\sum_{j=1}^{N}\sum_{i=1}^{6}(P_{j,t_2}-P_{j,t})^2}};$$

step ii. employing particle swarm optimization algorithm to obtain optimal parameters of the artificial neural network:

selecting 50 particles and setting current number of iterations to S=0, and generating initial position vector Z and initial velocity vector V of particles randomly, wherein the position vector of the $i^{th}$ particle is $Z_i=(z_{i,1}, z_{i,2}, \ldots, z_{i,L})$, and its velocity vector $V_i=(v_{i,1}, v_{i,2}, \ldots, v_{i,L})$; L is the vector length, and $L=L_{\theta^{(1)}}+L_{\theta^{(2)}}$, wherein $L_{\theta^{(1)}}$ is the number of elements of the weight matrix $\theta^{(1)}$, and $L_{\theta^{(2)}}$ is the number of elements of the weight matrix $\theta^{(2)}$;

inputting the position vector of each particle into the artificial neural network and calculating the fitness function value of each particle; recording the maximum fitness function value corresponding to the particle in the iteration process of $s^{th}$ step as $f\_\max(s)$, and setting the position of the particle with the largest fitness function value as global optimal position; storing the optimal individual position vector of particle j up to $s^{th}$ as $P_j(s)$, and storing the optimal group position vector of particle j up to $s^{th}$ as $I_j(s)$;

calculating the velocity vector of the particle j in $s+1^{th}$ step: $V_j(s+1)=W_sV_j(s)+c_1r_1(P_j(s)-Z_j(s))+c_2r_2(I_j(s)-Z_j(s))$, and updating the position vector of particle j: $Z_j(s+1)=Z_j(s)+V_j(s+1)$, where $r_1$ and $r_2$ are two random numbers with a uniform distribution between 0 and 1, and parameters $c_i$ and $c_2$ are constants 1 and 2; $W_s$ is the inertia weight corresponding to $s^{th}$ calculated by linear decline:

$$W_s = \frac{(W_b - W_e)(S_{max} - S)}{S_{max}} + W_e,$$

where, $S_{max}$ is the maximum number of iterations, and $w_b$ and $w_e$ are the values of the first and last iteration; $S_{max}=5000$, $W_b=0.9$, and $W_e=0.4$; restricting the maximum value of each element in the position vector is 1 and the minimum value is 0, and restricting the maximum value of each element in the speed vector is 1 and the minimum value is −1; checking whether the updated speed vector exceeds the boundary and adjusting the speed to the extreme value specified by the algorithm if it exceeds the boundary;

inputting the updated particle position vector to artificial neural network to obtain corresponding fitness of particles; increasing current number of iterations by one; continuing iteration of particle position vector until one of stop conditions is reached:

first, the difference between the values of the optimal fitness function corresponding to two consecutive iterative processes is less than 0.0001 second; second, the current number of iterations S reaches a maximum iteration number $S_{max}$;

obtaining an optimal artificial neural network with the weight matrix $\theta_{(1)}$ between the input layer and the hidden layer and the weight matrix $\theta^{(2)}$ between the hidden layer and the output layer;

step iii. applying the optimal initial weights $\theta^{(1)}$ and $\theta^{(2)}$ obtained by particle swarm optimization algorithm to the artificial neural network for prediction; saving the network model optimized by particle swarm optimization algorithm, that is an optimal prediction model of travel classification.

EMBODIMENTS

Figure 1:
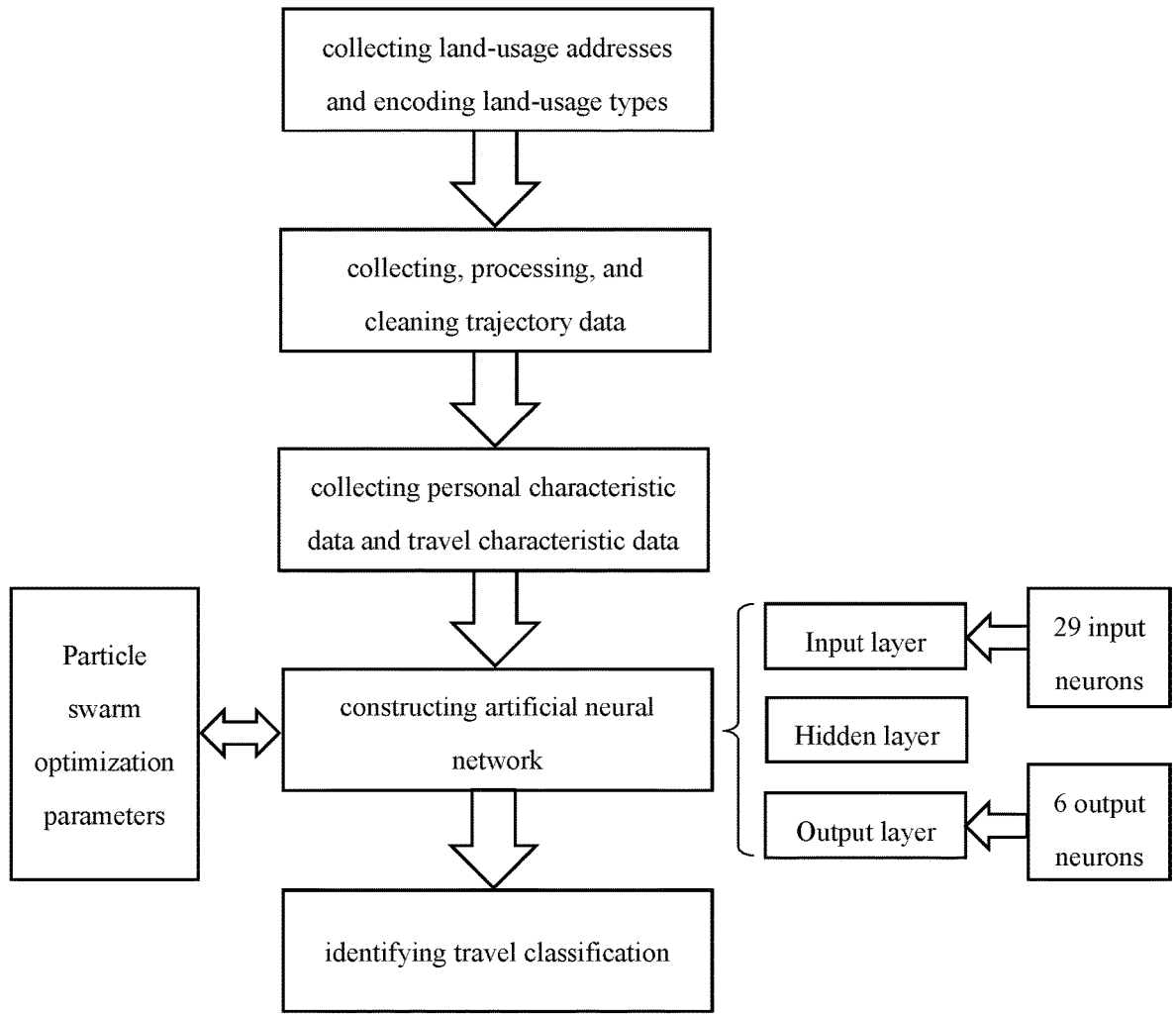
FIG. 1 is a schematic flow chart of the method for identifying travel classification based on smartphone travel surveys in an embodiment of the present invention.
Figure 2:
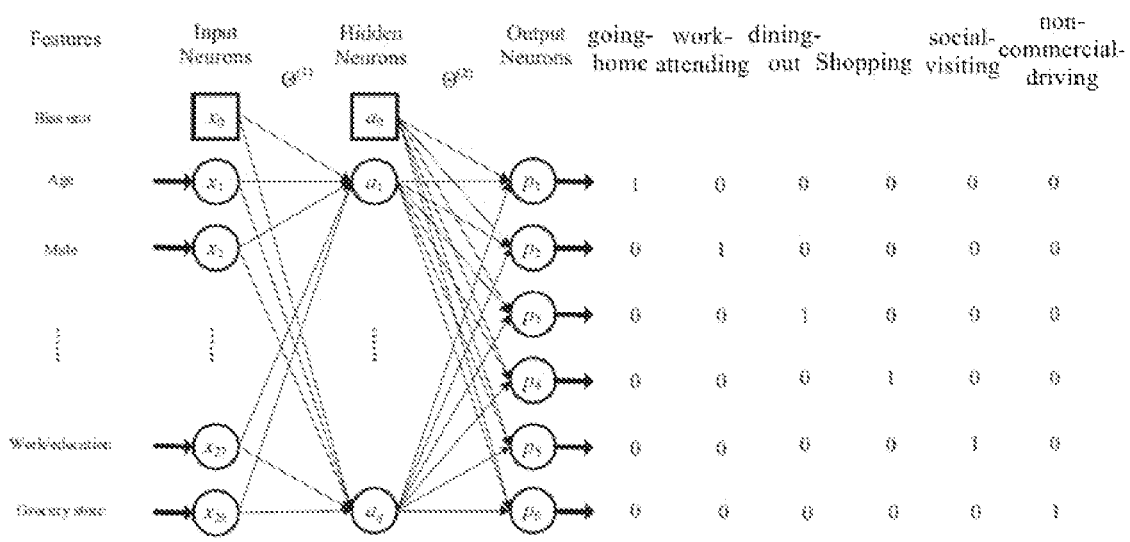
FIG. 2 is a structural diagram of an artificial neural network in an embodiment of the present invention.
Figure 3:
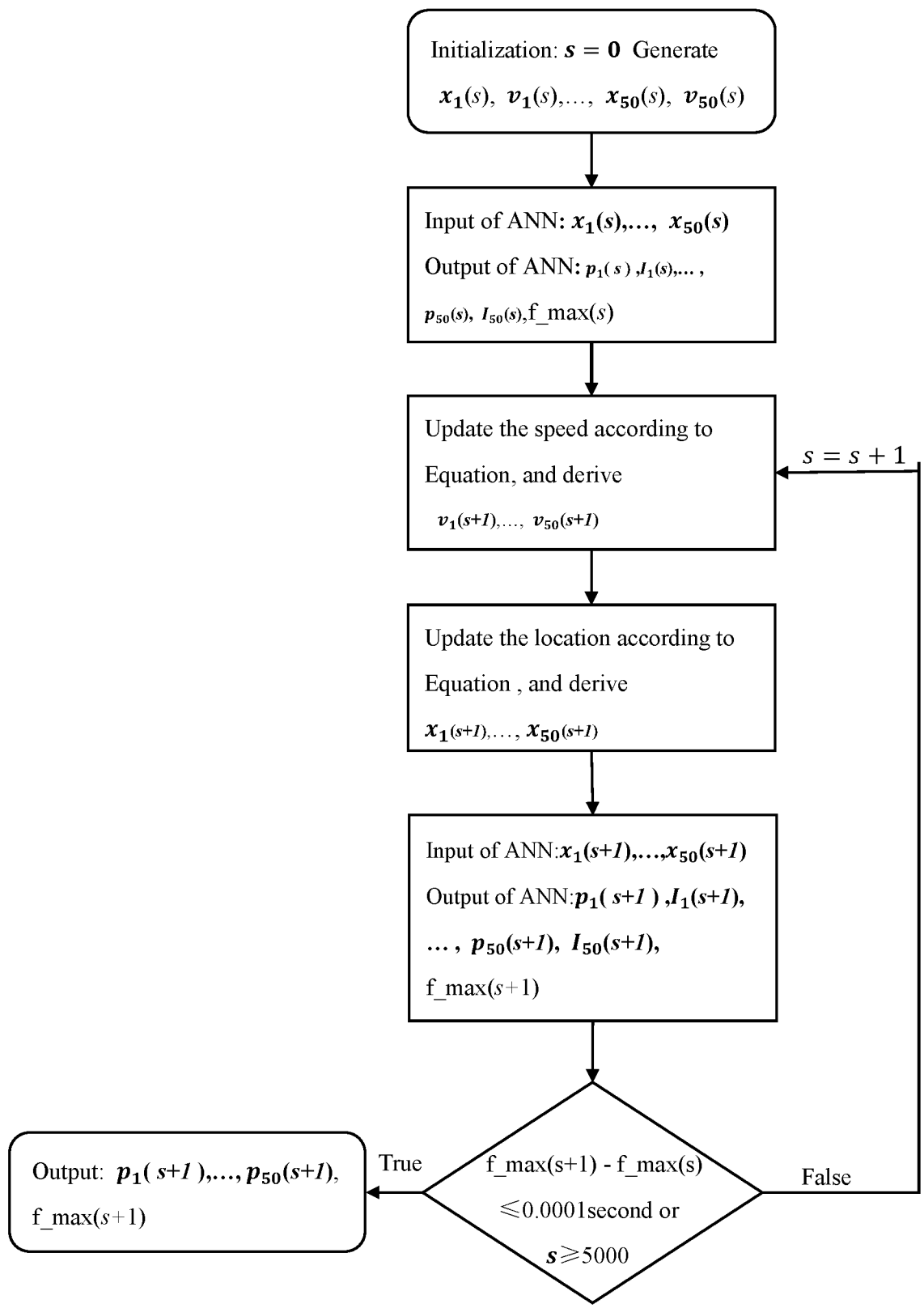
FIG. 3 is a flowchart of an artificial neural network with particle swarm algorithm in an embodiment of the present invention.

For clearer understanding of the object, the technical solution and the advantages of the present disclosure, the present disclosure is further described in detail in combination with the attached drawings and embodiments hereunder. It is understood that the specific embodiments described herein are meant only to explain, not to limit, the present disclosure.

The method for identifying travel classification based on smartphone travel surveys includes the following steps:

(1) collecting a multitude of addresses and encoding land-usage types;

step i. obtaining all addresses from a city's municipal database and classifying all addresses into 20 land-usage types, comprising type of residential area, type of administrative agency, type of school, type of gymnasium, type of medical establishment, type of retail shop, type of restaurant, type of hotel, type of financial institution, type of factory, type of logistics & warehouse, type of railway/bus station, type of sidewalk, type of provincial road, type of highway, type of parking lot, type of public utilities, type of park, type of river, and type of farming land;

step ii. obtaining corresponding longitude and latitude for each of the multitude of the addresses, and constructing Thiessen polygons as below: taking the addresses comprising various longitudes and latitudes as discrete points, and constructing, from the discrete points, a Delaunay triangulation network comprising a multitude of triangles; a Delaunay triangulation satisfies the rule that a Delaunay triangulation is a set of triangles that are adjacent to each other and do not overlap with each other, and that the circumcircle of each triangle contains no other points; a Delaunay triangulation is formed by connecting points corresponding to Voronoi polygons; the Delaunay triangle is formed by connecting three adjacent vertices, and the Voronoi polygons corresponding to the three adjacent vertices have a common vertex which is the center of the circumcircle of the Delaunay triangle; for each discrete point, selecting all triangles adjacent to one another and with said each discrete point as a common vertex; drawing a circumscribed circle for each triangle; connecting circumcircle centers of the circumscribed circles successively to obtain a Thiessen polygon; all polygons forming a set of Thiessen polygons; Each Thiessen polygon contains only one discrete point data; the point in the Thiessen polygon is closest to the corresponding discrete point; a point on the edge of a Tyson polygon is equidistant from the discrete points on both sides of the polygon;

step iii. grouping the 20 land-usage types of the Thiessen polygons into 10 types containing type of residential, type of administration & public services, type of commercial & business, type of industrial, type of logistics & warehouse, type of street & transportation, type of municipal utilities; type of green space, type of water bodies, and type of miscellaneous; renaming the type of residential area as the type of residential; grouping the type of administrative agency, the type of school, the type of gymnasium, the type of medical establishment into the type of administration & public services; grouping the type of retail shop, the type of restaurant, the type of hotel, the type of financial institution into the type of commercial & business facilities; renaming the type of factory industrial as the type of industrial; the type of logistics & warehouse remaining unchanged; grouping the type of railway/bus station, the type of sidewalk, the type of provincial road, the type of highway, the type of parking lot into the type of street & transportation; renaming the type of public utilities including water, power, heat, gas supply, park as the type of municipal utilities; renaming the type of park as the type of green space; renaming the type of river as the type of water bodies; renaming the type of farming land as the type of miscellaneous;

TABLE 1

Land-usage types based on polygon-level information.

| Land-usage type | Polygon-level categories |
| --- | --- |
| Residential | Residential area |
| Administration & public services | Administrative agency, school, gymnasium, medical establishment |
| Commercial & business facilities | Retail shop, restaurant, hotel, financial institution |
| Industrial | Factory |
| Logistics & warehouses | Logistics & warehouse |
| Street & transportation | Railway/bus station, sidewalk, provincial road, highway, parking lot |
| Municipal facilities | Public utilities (including water, power, heat, gas supply) |
| Green spaces | Park |
| Water bodies | River |
| miscellaneous | Farming land |

(2) collecting, processing, and cleaning trajectory data acquired by positioning software;

step i. installing positioning software in a smart phone of a volunteer with consent of the volunteer, and starting the software to record positioning data during travel, and then uploading the positioning data to database of server; the positioning data containing a series of positioning points in chronological order, and the data of positioning data including Universal time, user number, longitude, latitude, altitude, speed, horizontal position accuracy, number of satellites, and travel classification;

step ii. for two adjacent positioning points $d_1$ and $d_2$, calculating a distance d between $d_1$ and $d_2$, as $d=2R \cdot \arcsin(\sqrt{h})$, wherein $h=\sin^2(\Delta\varphi/2)+\cos(\varphi_1)\cos(\varphi_2)\sin^2(\Delta\lambda)$, wherein R being radius of the Earth, taken to be 6371 km, $\varphi_1$ being the latitude of the first positioning point, and $\varphi_2$ being the latitude of the second positioning point; $\Delta\lambda$ being the difference in longitude between the two points, and $\Delta\varphi$ being the difference in latitude between the two points;

calculating a speed of the positioning point at an interval of 2 seconds, with the speed corresponding to the $i^{th}$ positioning point being calculated as $v_i=(d_{i-1,i}+d_{i,i+1})/(t_{i+1}-t_{i-1})$, wherein $d_{i-1,i}$ representing the distance between the $i-1^{th}$ positioning point and the $i^{th}$ positioning point; $t_{i-1}$ representing positioning time of the $i-1^{th}$ positioning point; taking the calculated speed as an instantaneous speed of the $i^{th}$ point;

step iii. deleting the positioning points with either one of Universal Time, longitude, latitude, altitude, speed, horizontal position accuracy or satellite number missing; deleting the positioning points with less than 4 visible satellites; deleting the positioning points with horizontal position accuracy factor value greater than 6; deleting the positioning points with speed exceeding 200 km/H;

(3) collecting personal characteristic data and travel characteristic data;

step i. for each volunteer, forming a travel segment from a starting positioning point to an end positioning point in chronological order; dividing the travel segment into a multitude of sub-segments according to travel classifications; for each sub-segment O comprising two vectors X and P, wherein X representing the characteristics of the sub-segment, and P representing the travel classification of the sub-segment, wherein $X=(x_1, x_2, \ldots, x_{28})$, and $P=(p_1, p_2, p_3, p_4, p_5, p_6)$;

step ii. obtaining individual variables of volunteers in each sub-segment O by means of questionnaires, including age, gender, educational level, whether the working hours are fixed, monthly income, whether there are children in primary school in the family, and whether there are children in middle school in the family, which were expressed by $x_1, x_2, x_3, x_4, x_5, x_6, x_7$ respectively;

obtaining travel variables of each sub-segment O through the positioning software, including the sub-segment occurrence date, the sub-segment duration, the time from 12 o'clock in the morning to the start of the sub-segment, and five travel modes, which are respectively represented by $x_8, x_9, x_{10}, x_{11}, x_{12}, x_{13}, x_{14}, x_{15}$;

determining the land-usage type of the travel endpoint by means of the position of the sub-segment endpoint situated in the Thiessen polygons, being represented by $x_{16}, x_{17}, x_{18}, x_{19}, x_{20}, x_{21}, x_{22}, x_{23}, x_{24}, x_{25}$; the variables $x_{26}, x_{27}, x_{28}$ indicating whether the endpoint of the sub-segment is at type of home address, at type of work address, or at type of frequently-visited grocery store address;

the value rules of each variable are as follows: $x_1$ being a specific number indicating an age; $x_2=1$ or 0 indicating respectively the type of gender being male or female; $x_3=1$ indicating the type of educational level being bachelor degree or above, 0 otherwise; $x_4=1$ indicating the type of working time being fixed, 0 otherwise; $x_5=1$ indicating the type of monthly income being more than \$500, 0 otherwise; $x_6=1$ indicating family of the volunteer having children in primary school, 0 otherwise; $x_7=1$ indicating family of the volunteer having children in secondary school, 0 otherwise; $x_8=1$ indicating the sub-segment O occurring date being on the weekend, 0 otherwise; $x_9$ being a specific number indicating duration minutes of the sub-segment O; $x_{10}$ being a specific number indicating minutes from 12 a.m. to the start time of the sub-segment O; $x_{11}=1$ indicating type of the travel mode being walking, 0 otherwise; $x_{12}=1$ indicating type of the travel mode being bicycle, 0 otherwise; $x_{13}=1$ indicating type of the travel mode being electric vehicle, 0 otherwise; $x_{14}=1$ indicating type of the travel mode being bus, 0 otherwise; $x_{15}=1$ indicating type of the travel mode being car, 0 otherwise; $x_{16}=1$ indicating the land-usage type of the sub-segment endpoint being the type of residential, 0 otherwise; $x_{17}=1$ indicating the land-usage type of the sub-segment endpoint being the type of administration & public services, 0 otherwise; $x_{18}=1$ indicating the land-usage type of the sub-segment endpoint being the type of commercial & business facilities, 0 otherwise; $x_{19}=1$ indicating the land-usage type of the sub-segment endpoint being the type of industrial, 0 otherwise; $x_{20}=1$ indicating the land-usage type of the sub-segment endpoint being the type of logistics & warehouse, 0 otherwise; $x_{21}=1$ indicating the land-usage type of the sub-segment endpoint being the type of street & transportation, 0 otherwise; $x_{22}=1$ indicating the land-usage type of the sub-segment endpoint being the type of municipal utilities, 0 otherwise; $x_{23}=1$ indicating the land-usage type of the sub-segment endpoint being the type of green space, 0 otherwise; $x_{24}=1$ indicating the land-usage type of the sub-segment endpoint being the type of water bodies, 0 otherwise; $x_{25}=1$ indicating the land-usage type of the sub-segment endpoint being the type of miscellaneous, 0 otherwise; $x_{26}=1$ indicating the land-usage type of the sub-segment endpoint being the type of home, 0 otherwise; $x_{27}=1$ indicating the land-usage type of the sub-segment endpoint being the type of work & education, 0 otherwise; $x_{28}=1$ indicating the land-usage type of the sub-segment endpoint being the type of grocery store, 0 otherwise;

$p_1=1$ indicating the travel classification of the O being the type of going-home, 0 otherwise; $p_2=1$ indicating the travel classification of the O being the type of work-attending, 0 otherwise, and the type of work-attending also representing education-attending in the present invention; $p_3=1$ indicating the travel classification of the O being the type of dining-out, 0 otherwise; $p_4=1$ indicating the travel classification of the O being the type of shopping, 0 otherwise; $p_5=1$ indicating the travel classification of the O being the type of social-visiting, 0 otherwise; $p_6=1$ indicating the travel classification of the O being the type of non-commercial-driving representing picking up or dropping off someone in the present invention, 0 otherwise;

(4) constructing an artificial neural network based on particle swarm optimization for identifying travel classifications;

step i. building an artificial neural network with variables $x_0, x_1, \ldots, x_{28}$ in step c as an input layer, with predicted travel classification as an output layer, with a hidden layer with q neurons as $a_0, a_1, a_2, \ldots, a_q$; $x_0$ and $a_0$ are bias units;

dividing samples to be six groups according to P; choosing three-quarters randomly from each group to form a training data set and remaining one-quarter from each group to form a test data set;

for a weight matrix $\theta^{(1)}$ between the input layer and the hidden layer; employing linear weighted sum to obtain $Netin_{t_1} = \sum_{j=0}^{28} \theta_{t_1,j}^{(1)} x_j$ of an $t_1^{th}$ neuron of the hidden layer, wherein $t_1$ ranging from 1 to q; obtaining an output of the $t_1^{th}$ neuron $a_{t_1} = f(Netin_{t_1})$ by a activation sigmoid function $$f(x) = \frac{1}{1 + \exp(-x)};$$

for a weight matrix $\theta^{(2)}$ between the hidden layer and the output layer, employing linear weighted sum to obtain $Outnetin_{t_2} = \sum_{j=1}^{6} \theta_{t_2,j}^{(2)} a_j$ of the $t_2^{th}$ neuron of the output layer, wherein $t_2$ ranging from 1 to 6; obtaining an output of the $t_2^{th}$ neuron by inverse function: $P_{t_2} = f^{-1}(Outnetin_{t_2})$; for real output vectors $P_t$, obtaining a root mean square error of prediction result as: $RMSE = \sqrt{\sum_{j=1}^{N} \sum_{i=1}^{6} (P_{j,t_1} - P_{j,t})^2}$, where N is number of samples in the training data set, $P_{j,t_2}$ and $P_{j,t}$ are used to indicate predicted travel classification and reported travel classification respectively; obtaining fitness function as:

$$fitness = \frac{1}{1 + \sqrt{\sum_{j=1}^{N} \sum_{i=1}^{6} (P_{j,t_2} - P_{j,t})^2}};$$

step ii. employing particle swarm optimization algorithm to obtain optimal parameters of the artificial neural network:

selecting 50 particles and setting current number of iterations to S=0, and generating initial position vector Z and initial velocity vector V of particles randomly, wherein the position vector of the $i^{th}$ particle is $Z_i = (z_{i,1}, z_{i,2}, \ldots, z_{i,L})$, and its velocity vector $V_i = (v_{i,1}, v_{i,2}, \ldots, v_{i,L})$; L is the vector length, and $L = L_{\theta^{(1)}} + L_{\theta^{(2)}}$, wherein $L_{\theta^{(1)}}$ is the number of elements of the weight matrix $\theta^{(1)}$, and $L_{2^{(2)}}$ is the number of elements of the weight matrix $\theta^{(2)}$;

inputting the position vector of each particle into the artificial neural network and calculating the fitness function value of each particle; recording the maximum fitness function value corresponding to the particle in the iteration process of $s^{th}$ step as $f\_max(s)$, and setting the position of the particle with the largest fitness function value as global optimal position; storing the optimal individual position vector of particle j up to $s^{th}$ as $P_j(s)$, and storing the optimal group position vector of particle j up to $s^{th}$ as $I_j(s)$;

calculating the velocity vector of the particle j in $s+1^{th}$ step: $V_j(s+1) = W_s V_j(s) + c_1 r_1 (P_j(s) - Z_j(s)) + c_2 r_2 (I_j(s) - Z_j(s))$, and updating the position vector of particle j: $Z_j(s+1) = Z_j(s) + V_j(s+1)$, where $r_1$ and $r_2$ are two random numbers with a uniform distribution between 0 and 1, and parameters $c_1$ and $c_2$ are constants 1 and 2; $W_s$ is the inertia weight corresponding to $s^{th}$ calculated by linear decline:

$$W_s = \frac{(W_b - W_e)(S_{max} - S)}{S_{max}} + W_e,$$

where, $S_{max}$ is the maximum number of iterations, and $w_b$, and $w_e$ are the values of the first and last iteration; $S_{max}=5000$, $W_b=0.9$, and $W_e=0.4$: restricting the maximum value of each element in the position vector is 1 and the minimum value is 0, and restricting the maximum value of each element in the speed vector is 1 and the minimum value is −1; checking whether the updated speed vector exceeds the boundary and adjusting the speed to the extreme value specified by the algorithm if it exceeds the boundary;

inputting the updated particle position vector to artificial neural network to obtain corresponding fitness of particles; increasing current number of iterations by one; continuing iteration of particle position vector until one of stop conditions is reached:

first, the difference between the values of the optimal fitness function corresponding to two consecutive iterative processes is less than 0.0001 second; second, the current number of iterations S reaches a maximum iteration number $S_{max}$;

obtaining an optimal artificial neural network with the weight matrix $\theta^{(1)}$ between the input layer and the hidden layer and the weight matrix $\theta^{(2)}$ between the hidden layer and the output layer;

step iii. applying the optimal initial weights $\theta^{(1)}$ and $\theta^{(2)}$ obtained by particle swarm optimization algorithm to the artificial neural network for prediction; saving the network model optimized by particle swarm optimization algorithm, that is an optimal prediction model of travel classification.

In order to evaluate the effect of the embodiment of the present invention, the GPS data and travel features of 2409 person-days of 321 respondents in a city were collected from October 2013 to June 2015. The number of days that each respondent participated in the survey ranged from 7 to 12 days. A total of 7,039 travels with six travel classification comprising type of going-home, type of work-attending, type of dining-out, type of shopping, type of social-visiting and type of non-commercial-driving were verified in the survey. In order to explore the classification performance of the proposed method, recall rate and precision rate are used to evaluate the classification ability of each travel classification. The confusion matrices corresponding to the training and testing data sets of the present invention are shown in Table 2 and Table 3, respectively. Overall, 97.22% and 96.53% of the samples in the training and test data sets were correctly labeled, respectively. Although the recall rate and precision rate corresponding to the training data sets are higher than those of the testing data sets, the maximum difference is only 2.27%, indicating that this classification method has good generalization ability.

TABLE 2

Identification results of the training data set.

| | | Predicted travel classifications | | | | | |
|---|---|---|---|---|---|---|---|
| | | Going-home | Work-attending | Dining-out | Shopping | Social-visiting | non-commercial-driving | Recall (%) |
| Reported travel Classifications | Going-home | 2018 | 1 | 2 | 2 | 1 | 0 | 99.70 |
| | Work-attending | 1 | 1487 | 1 | 3 | 4 | 1 | 99.30 |
| | Dining-out | 3 | 2 | 374 | 16 | 4 | 2 | 93.27 |
| | Shopping | 7 | 10 | 25 | 584 | 27 | 5 | 88.62 |
| | Social-visiting | 0 | 1 | 3 | 10 | 324 | 2 | 95.29 |
| | non-commercial-driving | 1 | 2 | 4 | 3 | 3 | 346 | 96.38 |
| Precision (%) | | 99.41 | 98.94 | 91.44 | 94.50 | 89.26 | 97.19 | 97.22 |

TABLE 3

Identification results of the test data set.

| | | Predicted travel classifications | | | | | |
|---|---|---|---|---|---|---|---|
| | | Going-home | Work-attending | Dining-out | Shopping | Social-visiting | non-commercial-driving | Recall (%) |
| Reported travel Classifycations | Going-home | 671 | 0 | 1 | 1 | 1 | 0 | 99.55 |
| | Work-attending | 1 | 493 | 0 | 2 | 2 | 1 | 98.80 |
| | Dining-out | 1 | 1 | 123 | 6 | 2 | 1 | 91.79 |
| | Shopping | 3 | 6 | 9 | 190 | 10 | 2 | 86.36 |
| | Social-visiting | 0 | 0 | 2 | 3 | 107 | 1 | 94.69 |
| | non-commercial-driving | 0 | 1 | 2 | 1 | 1 | 114 | 95.80 |
| Precision (%) | | 99.26 | 98.40 | 89.78 | 93.60 | 86.99 | 95.80 | 96.53 |

In order to compare the classification performance of neural network particle swarm algorithm with other commonly used methods, four representative methods are used to deal with the classification problem. These methods are support vector machine (SVM), Bayesian networks (BN), Multinominal logit models (MLN), and back-propagation neural networks. The accuracy of these methods in the training and testing data sets is shown in Table 4.

TABLE 4

Comparison of identification accuracy.

| | Training data set | | | Test data set | | |
|---|---|---|---|---|---|---|
| Methods | Sample size | Correctly detected | Accuracy (%) | Sample size | Correctly detected | Accuracy (%) |
| SVM | 5280 | 4745 | 89.87 | 1759 | 1532 | 87.09 |
| BN | 5280 | 4653 | 88.13 | 1759 | 1524 | 86.64 |
| MLN | 5280 | 4404 | 83.41 | 1759 | 1410 | 80.16 |
| ANN-BP | 5280 | 5022 | 95.11 | 1759 | 1650 | 93.80 |
| ANN-PSO | 5280 | 5133 | 97.22 | 1759 | 1698 | 96.53 |

Among these methods, the artificial neural network with particle swarm algorithm has reached the highest accuracy on both training and testing data sets, and the artificial neural network with particle swarm algorithm has better classification performance than other classifiers.

Finally, it should be noted that the above descriptions are only preferred embodiments of the present disclosure with explanation of the relevant technical principles. Persons skilled in the art understand that the present disclosure is not limited to the particular embodiments described herein and that it is possible for persons skilled in the art to undertake any appreciable variation, readjustment or replacement without departing from the scope of protection of the present disclosure. Therefore, although the present disclosure is described in more detail through the above embodiments, the present disclosure is not limited to the above embodiments, but may include many other equivalent embodiments without departing from the conception of the present disclosure, which shall fall within the scope of the present disclosure as is described in the appended claims.

We claim:

1. A method for identifying travel classification based on smartphone travel surveys, comprising the following steps:
    step a. collecting a multitude of addresses and encoding land-usage types;
    step b. collecting, processing, and cleaning trajectory data acquired by positioning software;
    step c. collecting personal characteristic data and travel characteristic data;
    step d. constructing an artificial neural network based on particle swarm optimization for identifying travel classifications;
    step a comprises the following steps:
    step i. obtaining all addresses from a city's municipal database and classifying all addresses into 20 land-usage types, comprising type of residential area, type of administrative agency, type of school, type of gymnasium, type of medical establishment, type of retail shop, type of restaurant, type of hotel, type of financial institution, type of factory, type of logistics & warehouse, type of railway/bus station, type of sidewalk, type of provincial road, type of highway, type of parking lot, type of public utilities, type of park, type of river, and type of farming land;

step ii. obtaining corresponding longitude and latitude for each of the multitude of the addresses, and constructing Thiessen polygons as below: taking the addresses comprising various longitudes and latitudes as discrete points, and constructing, from the discrete points, a Delaunay triangulation network comprising a multitude of triangles; for each discrete point, selecting all triangles adjacent to one another and with said each discrete point as a common vertex; drawing a circumscribed circle for each triangle; connecting circumcircle centers of the circumscribed circles successively to obtain a Thiessen polygon; all polygons forming a set of Thiessen polygons;

step iii. grouping the 20 land-usage types of the Thiessen polygons into 10 types containing type of residential, type of administration & public services, type of commercial & business, type of industrial, type of logistics & warehouse, type of street & transportation, type of municipal utilities; type of green space, type of water bodies, and type of miscellaneous; renaming the type of residential area as the type of residential; grouping the type of administrative agency, the type of school, the type of gymnasium, the type of medical establishment into the type of administration & public services; grouping the type of retail shop, the type of restaurant, the type of hotel, the type of financial institution into the type of commercial & business facilities; renaming the type of factory industrial as the type of industrial; the type of logistics & warehouse remaining unchanged; grouping the type of railway/bus station, the type of sidewalk, the type of provincial road, the type of highway, the type of parking lot into the type of street & transportation; renaming the type of public utilities including water, power, heat, gas supply, park as the type of municipal utilities; renaming the type of park as the type of green space; renaming the type of river as the type of water bodies; renaming the type of farming land as the type of miscellaneous;

step b comprises the following steps:

step i. installing positioning software in a smart phone of a volunteer with consent of the volunteer, and starting the software to record positioning data during travel, and then uploading the positioning data to database of server; the positioning data containing a series of positioning points in chronological order, and the data of positioning data including Universal time, user number, longitude, latitude, altitude, speed, horizontal position accuracy, number of satellites, and travel classification;

step ii. for two adjacent positioning points $d_1$ and $d_2$, calculating a distance d between $d_1$ and $d_2$, as $d=2R\cdot\arcsin(\sqrt{h})$, wherein $h=\sin^2(\Delta\varphi/2)+\cos(\varphi_1)\cos(\varphi_2)\sin^2(\Delta\lambda)$, wherein R being radius of the Earth, taken to be 6371 km, $\varphi_1$ being the latitude of the first positioning point, and $\varphi_2$ being the latitude of the second positioning point; $\Delta\lambda$ being the difference in longitude between the two points, and $\Delta\varphi$ being the difference in latitude between the two points;

calculating a speed of the positioning point at an interval of 2 seconds, with the speed corresponding to the $i^{th}$ positioning point being calculated as $v_i=(d_{i-1,i}+d_{i,i+1})/(t_{i+1}-t_{i-1})$, wherein $d_{i-1,i}$ representing the distance between the i-1$^{th}$ positioning point and the $i^{th}$ positioning point; $t_{i-1}$ representing positioning time of the i-1$^{th}$ positioning point; taking the calculated speed as an instantaneous speed of the $i^{th}$ point;

step iii. deleting the positioning points with either one of Universal Time, longitude, latitude, altitude, speed, horizontal position accuracy or satellite number missing; deleting the positioning points with less than 4 visible satellites; deleting the positioning points with horizontal position accuracy factor value greater than 6; deleting the positioning points with speed exceeding 200 km/H;

step c comprises the following steps:

step i. for each volunteer, forming a travel segment from a starting positioning point to an end positioning point in chronological order; dividing the travel segment into a multitude of sub-segments according to travel classifications; for each sub-segment O comprising two vectors X and P, wherein X representing the characteristics of the sub-segment, and P representing the travel classification of the sub-segment, wherein $X=(x_1, x_2, \ldots, x_{28})$, and $P=(p_1, p_2, p_3, p_4, p_5, p_6)$;

step ii. obtaining individual variables of volunteers in each sub-segment O by means of questionnaires, including age, gender, educational level, whether the working hours are fixed, monthly income, whether there are children in primary school in the family, and whether there are children in middle school in the family, which were expressed by $x_1, x_2, x_3, x_4, x_5, x_6, x_7$ respectively;

obtaining travel variables of each sub-segment O through the positioning software, including the sub-segment occurrence date, the sub-segment duration, the time from 12 o'clock in the morning to the start of the sub-segment, and five travel modes, which are respectively represented by $x_8, x_9, x_{10}, x_{11}, x_{12}, x_{13}, x_{14}, x_{15}$;

determining the land-usage type of the travel endpoint by means of the position of the sub-segment endpoint situated in the Thiessen polygons, being represented by $x_{16}, x_{17}, x_{18}, x_{19}, x_{20}, x_{21}, x_{22}, x_{23}, x_{24}, x_{25}$; the variables $x_{26}, x_{27}, x_{28}$ indicating whether the endpoint of the sub-segment is at type of home address, at type of work address, or at type of frequently-visited grocery store address;

the value rules of each variable are as follows: $x_1$ being a specific number indicating an age; $x_2$=1 or 0 indicating respectively the type of gender being male or female; $x_3$=1 indicating the type of educational level being bachelor degree or above, 0 otherwise; $x_4$=1 indicating the type of working time being fixed, 0 otherwise; $x_5$=1 indicating the type of monthly income being more than $500, 0 otherwise; $x_6$=1 indicating family of the volunteer having children in primary school, 0 otherwise; $x_7$=1 indicating family of the volunteer having children in secondary school, 0 otherwise; $x_8$=1 indicating the sub-segment O occurring date being on the weekend, 0 otherwise; $x_9$ being a specific number indicating duration minutes of the sub-segment O; $x_{10}$ being a specific number indicating minutes from 12 a.m. to the start time of the sub-segment O; $x_{11}$=1 indicating type of the travel mode being walking, 0 otherwise; $x_{12}$=1 indicating type of the travel mode being bicycle, 0 otherwise; $x_{13}$=1 indicating type of the travel mode being electric vehicle, 0 otherwise; $x_{14}$=1 indicating type of the travel mode being bus, 0 otherwise; $x_{15}$=1 indicating type of the travel mode being car, 0 otherwise; $x_{16}$=1 indicating the land-usage type of the sub-segment endpoint being the type of residential, 0 otherwise; $x_{17}=1$ indicating the land-usage type of the sub-segment endpoint being the type of administration & public services, 0 otherwise; $x_{18}=1$ indicating the land-usage type of the sub-segment endpoint being the type of commercial & business facilities, 0 otherwise; $x_{19}=1$ indicating the land-usage type of the sub-segment endpoint being the type of industrial, 0 otherwise; $x_{20}=1$ indicating the land-usage type of the sub-segment endpoint being the type of logistics & warehouse, 0 otherwise; $x_{21}=1$ indicating the land-usage type of the sub-segment endpoint being the type of street & transportation, 0 otherwise; $x_{22}=1$ indicating the land-usage type of the sub-segment endpoint being the type of municipal utilities, 0 otherwise; $x_{23}=1$ indicating the land-usage type of the sub-segment endpoint being the type of green space, 0 otherwise; $x_{24}=1$ indicating the land-usage type of the sub-segment endpoint being the type of water bodies, 0 otherwise; $x_{25}=1$ indicating the land-usage type of the sub-segment endpoint being the type of miscellaneous, 0 otherwise; $x_{26}=1$ indicating the land-usage type of the sub-segment endpoint being the type of home, 0 otherwise; $x_{27}=1$ indicating the land-usage type of the sub-segment endpoint being the type of work & education, 0 otherwise; $x_{28}=1$ indicating the land-usage type of the Sub-segment endpoint being the type of grocery store, 0 otherwise;

$p_1=1$ indicating the travel classification of the O being the type of going-home, 0 otherwise; $p_2=1$ indicating the travel classification of the O being the type of work-attending, 0 otherwise; $p_3=1$ indicating the travel classification of the O being the type of dining-out, 0 otherwise; $p_4=1$ indicating the travel classification of the O being the type of shopping, 0 otherwise; $p_5=1$ indicating the travel classification of the O being the type of social-visiting, 0 otherwise; $p_6=1$ indicating the travel classification of the O being the type of non-commercial-driving, 0 otherwise;

step d comprises the following steps:

step i. building an artificial neural network with variables $x_0, x_1, \ldots, x_{28}$ in step c as an input layer, with predicted travel classification as an output layer, with a hidden layer with q neurons as $a_0, a_1, a_2, \ldots, a_q$; $x_0$ and $a_0$ are bias units;

dividing samples to be six groups according to P; choosing three-quarters randomly from each group to form a training data set and remaining one-quarter from each group to form a test data set;

for a weight matrix $\theta^{(1)}$ between the input layer and the hidden layer; employing linear weighted sum to obtain $Netin_{t_1} = \sum_{j=0}^{28} \theta_{t_1,j}^{(1)} x_j$ of an $t_1^{th}$ neuron of the hidden layer, wherein $t_1$ ranging from 1 to q; obtaining an output of the $t_1^{th}$ neuron $a_{t_1}=f(Netin_{t_1})$ by a activation sigmoid function $$f(x) = \frac{1}{1+\exp(-x)};$$

for a weight matrix $\theta^{(2)}$ between the hidden layer and the output layer, employing linear weighted sum to obtain $Outnetin_{t_2} = \sum_{j=1}^{6} \theta_{t_2,j}^{(2)} a_j$ of the $t_2^{th}$ Neuron of the output layer, wherein $t_2$ ranging from 1 to 6; obtaining an output of the $t_2^{th}$ neuron by inverse function: $P_{t_2} = f^{-1}(Outnetin_{t_2})$; for real output vectors $P_t$, obtaining a root mean square error of prediction result as: $RMSE = \sqrt{\sum_{j=1}^{N} \sum_{i=1}^{6} (P_{j,t_2} - P_{j,t})^2}$, where N is number of samples in the training data set, $P_{j,t_2}$ and $P_{j,t}$ are used to indicate predicted travel classification and reported travel classification respectively; obtaining fitness function as:

$$fitness = \frac{1}{1+\sqrt{\sum_{j=1}^{N}\sum_{i=1}^{6}(P_{j,t_2}-P_{j,t})^2}};$$

step ii. employing particle swarm optimization algorithm to obtain optimal parameters of the artificial neural network:

selecting 50 particles and setting current number of iterations to S=0, and generating initial position vector Z and initial velocity vector V of particles randomly, wherein the position vector of the $i^{th}$ particle is $Z_i=(z_{i,1}, z_{i,2}, \ldots, z_{i,L})$, and its velocity vector $V_i=(v_{i,1}, v_{i,2}, \ldots, v_{i,L})$; L is the vector length, and $L=L_{\theta^{(1)}}+L_{\theta^{(2)}}$, wherein $L_{\theta^{(1)}}$ is the number of elements of the weight matrix $\theta^{(1)}$, and $L_{\theta^{(2)}}$ is the number of elements of the weight matrix $\theta^{(2)}$;

inputting the position vector of each particle into the artificial neural network and calculating the fitness function value of each particle; recording the maximum fitness function value corresponding to the particle in the iteration process of $s^{th}$ step as $f\_max(s)$, and setting the position of the particle with the largest fitness function value as global optimal position; storing the optimal individual position vector of particle j up to $s^{th}$ as $P_j(s)$, and storing the optimal group position vector of particle j up to $s^{th}$ as $I_j(s)$;

calculating the velocity vector of the particle j in $s+1^{th}$ step: $V_j(s+1)=W_s V_j(s)+c_1 r_1(P_j(s)-Z_j(s))+c_2 r_2(I_j(s)-Z_j(s))$, and updating the position vector of particle j: $Z_j(s+1)=Z_j(s)+V_j(s+1)$, where $r_1$ and $r_2$ are two random numbers with a uniform distribution between 0 and 1, and parameters $c_1$ and $c_2$ are constants 1 and 2; $W_s$ is the inertia weight corresponding to $s^{th}$ calculated by linear decline:

$$W_s = \frac{(W_b - W_e)(S_{max} - S)}{S_{max}} + W_e,$$

where $S_{max}$ is the maximum number of iterations, and $w_b$ and $w_e$ are the values of the first and last iteration; $S_{max}=5000$, $W_b=0.9$, and $W_e=0.4$; restricting the maximum value of each element in the position vector is 1 and the minimum value is 0, and restricting the maximum value of each element in the speed vector is 1 and the minimum value is −1; checking whether the updated speed vector exceeds the boundary and adjusting the speed to the extreme value specified by the algorithm if it exceeds the boundary;

inputting the updated particle position vector to artificial neural network to obtain corresponding fitness of particles; increasing current number of iterations by one; continuing iteration of particle position vector until one of stop conditions is reached:

first, the difference between the values of the optimal fitness function corresponding to two consecutive iterative processes is less than 0.0001 second; second, the current number of iterations S reaches a maximum iteration number $S_{max}$;

obtaining an optimal artificial neural network with the weight matrix $\theta^{(1)}$ between the input layer and the hidden layer and the weight matrix $\theta^{(2)}$ between the hidden layer and the output layer;

step iii. applying the optimal initial weights $\theta^{(1)}$ and $\theta^{(2)}$ obtained by particle swarm optimization algorithm to the artificial neural network for prediction; saving the network model optimized by particle swarm optimization algorithm, that is an optimal prediction model of travel classification.

* * * * *